United States Patent [19]
Bogut et al.

[11] Patent Number: 5,325,040
[45] Date of Patent: Jun. 28, 1994

[54] METHOD AND APPARATUS FOR CHARGING A BATTERY POWERED ELECTRONIC DEVICE

[75] Inventors: Henry A. Bogut, Coral Springs; Joseph Patino, Plantation; Allen L. Christenson, Tamarac, all of Fla.

[73] Assignee: Motorola, Inc., Schaumburg, Ill.

[21] Appl. No.: 947,694

[22] Filed: Sep. 21, 1992

[51] Int. Cl.⁵ .................................................. H02J 7/04
[52] U.S. Cl. ............................................. 320/22; 320/39
[58] Field of Search ..................... 320/22, 23, 24, 31, 320/32, 35, 36, 39, 40, 43, 44

[56] References Cited
U.S. PATENT DOCUMENTS

| | | | |
|---|---|---|---|
| 4,006,396 | 2/1977 | Bogut | 320/22 X |
| 4,843,299 | 6/1989 | Hutchings | 320/31 |
| 4,888,544 | 12/1989 | Terry et al. | 320/22 X |
| 4,965,738 | 10/1990 | Bauer et al. | 320/39 X |
| 5,115,182 | 5/1992 | Ehmke et al. | 320/22 X |
| 5,122,722 | 6/1992 | Goedken et al. | 320/22 |
| 5,130,634 | 7/1992 | Kasai | 320/22 |
| 5,150,031 | 9/1992 | James et al. | 320/39 X |
| 5,184,059 | 2/1993 | Patino et al. | 320/39 X |
| 5,191,277 | 3/1993 | Ishikura et al. | 320/22 |
| 5,254,931 | 10/1993 | Martensson | 320/22 |

Primary Examiner—Kristine L. Peckman
Attorney, Agent, or Firm—Pedro P. Hernandez

[57] ABSTRACT

A battery charger (102) includes an input terminal (124) for receiving control signals from radio (104). The control signals are received by a charge controller (112) which provides a charge rate to radio battery pack (106) which is a function of the control signal. Radio (104) includes a controller (126) which can sense the state of the radio battery pack (106), as well as changes in the state of radio (104). Controller (126) can then modify the control signal sent to charger (102) and therefor the battery charge rate proved by charger (102) based on certain changes in the state of battery pack (106) or radio (104).

5 Claims, 3 Drawing Sheets

METHOD AND APPARATUS FOR CHARGING A BATTERY POWERED ELECTRONIC DEVICE

TECHNICAL FIELD

This invention relates generally to the field of battery powered devices and more specifically to a method and apparatus for charging a battery powered device.

BACKGROUND

Battery chargers are commonly used for charging battery operated electronic devices such as battery operated pagers, cellular telephones and radios. Modern chargers used for charging such communication devices are typically capable of charging at different charge rates. For example, a typical battery charger can charge both at a rapid-charge rate and a trickle charge rate depending on the condition of the battery. A charger will usually first determine the capacity of the battery to be charged by sensing a code resistor in the battery which informs the charger of the capacity of the battery. The charger then begins to charge the battery using a predetermined charge rate based on the battery's capacity. While charging the battery, the charger senses the temperature of the battery by using a thermistor which is part of the battery. If the battery begins to heat up beyond predetermined limits, the battery charger lowers the rate the battery is being charged at in order to prevent the battery from being damaged.

One problem with present day chargers is that in order to be able to change charge rates and determine the temperature of the battery requires the charger to have a costly on-board controller such as a microprocessor, or costly discrete components to perform the control function. Another technique employed by prior art chargers such as that disclosed in U.S. Pat. No. 5,115,182, entitled "Battery Charging Controller For A Battery Powered Device And Method For Using The Same", by Ehmke et al., is for either the charger to provide several current outputs and have the battery powered device select the appropriate current source, or have the electronic device generate several current sources from a single charger output with the battery powered device again selecting the appropriate current source.

Another problem with prior art charging systems is that while an electronic device such as a radio is being charged, it can change state from a standby state to a state in which the unit is operational, such as the case of a cellular telephone that is being charged while the telephone user is operating the unit. The problem with the radio changing states while it is being charged is that more current is required by the unit in the operational state then when it is in the standby mode. If the battery charger can not compensate for this increase need for current immediately, the unit may begin to consume energy from its battery if the unit is requiring more current then the charger is providing. A need thus exists for a charging system which can automatically compensate for a units change in current requirements while being charged, and also for a charger which does not require the expense of an on-board control unit.

DETAILED DESCRIPTION OF THE PREFERRED EMBODIMENT

Figure 1:
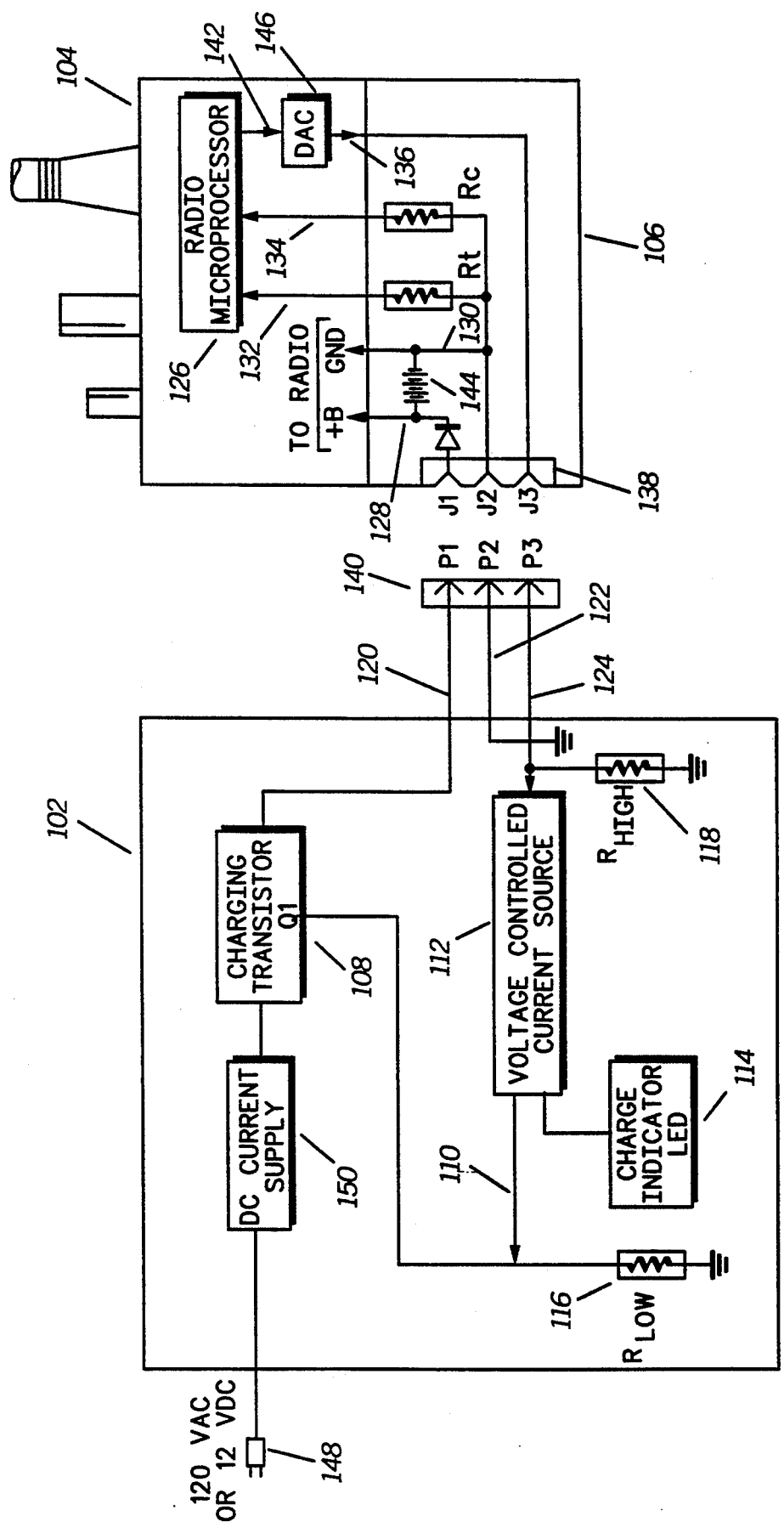
FIG. 1 is a block diagram of a radio and charger system in accordance with the present invention.

Referring now to the drawings and specifically to FIG. 1, there is shown a block diagram of a charger 102 and electronic device 104 in accordance with the present invention. Electronic device 104 in the preferred embodiment is a battery powered communication device such as a two-way radio. Radio 104 includes a control means such as a microprocessor or microcontroller 126 which is in charge of controlling the radio's operations, including the radio's transceiver section (not shown). Microprocessor 126 preferably includes on-board memory and input/output capabilities.

Coupled to radio 104 is a battery 106 such as a rechargeable nickel cadmium battery pack. Battery pack 106 includes a capacity code resistor (Rc) and a thermistor (Rt) coupled to battery cells 144. Both the capacity resistor (Rc) and thermistor (Rt) are coupled to controller 126 via electrical connections 134 and 132, respectively. Battery pack 106 (hereinafter referred to as battery 106) also includes a ground line 130 and B+ line 128 coupled to radio 104 which provides energy to the circuits of radio 104. The B+ line from connector 138 includes a blocking diode to prevent discharging of the battery through the charging contacts.

Included as part of radio 104 is a digital to analog converter (DAC) 146 which converts digital information coming from one of the controller's output line 142 into analog information at the DAC's output line 136. The analog information generated by DAC 146 is preferably an analog voltage level corresponding to the signal sent from controller 126 which is in turn sent to charger 102. DAC 146 could also be combined as part of controller 126 as is available in some commercially available controllers or could be designed into a custom designed controller for use with the present invention.

Battery 106 is mated to charger 102 via jack 138 and plug 140. Jack 138 and plug 140 when mated together electrically connect the battery's B+ 128, ground 130, and data 136 lines to the appropriate connections in charger 102.

Charger 102 receives energy from an input energy source such as a conventional alternating current (AC) or direct current (DC) source 148. If the input energy source is coming from a conventional AC outlet, DC current supply section 150 converts the AC into DC. DC current supply section 150 includes a conventional rectification circuit which converts the AC source into a DC source having a predetermined voltage level as known in the art. DC supply section 150 is in turn coupled to a charging means such as a charging transistor 108 which regulates the flow of current to battery 106. The amount of base current supplied to transistor 108 is controlled by a charge control means such as a voltage controlled current source 112. Voltage controlled current source 112 is preferably a non-inverting operational amplifier which receives the voltages supplied by DAC 146 via line 124.

Resistor ($R_{LOW}$) 116 is coupled to the output of voltage controlled current source 112 and is used to develop a voltage level in order to control the amount of current which is provided by transistor 108 by controlling the base current of transistor 108. An optional charger indicator circuit 114 as known in the art can be added to charger 102 which informs a user when charger 102 is providing current to battery 106. The charger indicator circuit would determine when the voltage control current source 112 produced a voltage level on output line 110 which is above a certain threshold. Upon determining that the voltage threshold had been met, a light emitting diode (LED) would be activated in order to inform the user that battery 106 is being charged.

A second resistor (pull-down resistor, $R_{HIGH}$) 118 is coupled to the input of voltage controlled current source 112 for forcing charger 102 to operate at a predetermined charge rate (e.g., at a trickle charge rate) when no voltage is present at line 124 from DAC 146.

In order to charge battery 106, charger 102 is plugged into an AC socket, and the charge cable plug 140 is plugged into battery jack 138. For normal charging to occur, radio 104 has to be attached to battery 106 since the rate that battery 106 is to be charged at is determined by controller 126. Charging of the battery is initiated by controller 126 supplying a voltage level via line 124 to charger control means 112 and then determining if current is being drawn by battery 106. If current is being drawn, controller 126 instructs charger 102 via a predetermined voltage level on line 124 to begin rapid charging the battery. If after the voltage level is supplied to charger 102 it is determined by controller 126 that no current is being drawn by battery 106, it indicates to controller 126 that battery 106 is not attached to charger 102 and to continue normal operation. Controller 126 can determine if battery 106 is being charged by measuring the resistance of thermistor (Rt) which is attached to one of the controller's input ports. The resistance of thermistor (Rt) increases as the battery begins to heat up due to the charging process.

Controller 126 interrogates the attached battery and reads the battery's Rt and Rc values to determine the temperature of the battery and the battery's mill-Amphour capacity rating, respectively. Controller 126 then determines the appropriate charge rate for the attached battery and puts out a corresponding digital signal to DAC 146 via line 142. An analog voltage from DAC 146 is then supplied from the radio 104, to the voltage controlled current source 112 via the battery charging cable. The charger control circuit in the preferred embodiment comprises a charging transistor 108 and a non-inverting op-amp configured as a linear voltage controlled current source circuit 112.

The relationship between input voltage via line 124 from the radio and the amount of current supplied by transistor 108 can be adjusted by varying circuit component values in voltage controlled current source circuit 112. In the preferred embodiment, the relationship is for 1 volt present at the input of circuit 112 to equate to approximately a 600 milli-amp (mA) current rate, up to 5 volts corresponding to a 2500 mA current rate.

The point at which rapid charging of battery 106 is terminated can be determined by such conventional methods as delta-temperature characterization, delta-voltage characterization, or by other known methods since the radio's controller 126 has constant access to the battery's terminal voltage (B+), thermistor (Rt), and code resistor (Rc). A trickle battery charge routine is initiated after the rapid charge rate is terminated by controller 126. Preferably, the trickle charge rate is entered when controller 126 informs DAC 146 to output zero volts at output line 136. The default trickle charge rate can be modified by modifying some of the component values in charger 102.

One advantage of having controller 126 control of the amount of current provided by charger 102 is that in the case radio 104 is about to transmit while battery 106 is being charged, controller 126 can quickly modify the charge rate applied to battery 106. The battery charge rate is changed by controller 126 changing the control voltage present at the input of voltage controlled current source 112. Since radio controller 126 knows when the radio is about to enter the transmit or receive mode, the current consumption of radio 104 in either the receive or transmit modes, and the control signal needed (e.g., the voltage level provided by DAC 146) to compensate for the change in current consumption, a control voltage can be generated to produce enough compensation charge current to take care of the case where radio is drawing more current than when it is in the stand-by mode. By automatically compensating for changes in the operation of radio 104, charger 102 allows for battery 106 to be charged quicker than when using prior art chargers.

With the present invention, if radio 104 is turned on, but battery 106 is depleted to the point where it will not support the controller's operation (the voltage provided by battery 106 is to low to operate radio controller 126), battery 106 will charge at the default trickle rate until a sufficient charge is present in battery 106 to operate controller 126, at which point rapid charging of the battery can commence. If either, radio 104 is turned off, or if radio 104 is not attached to battery 106 while battery 106 is being charged, charger 102 will also charge at a trickle battery charge rate (e.g., 100 mA).

Figure 2:
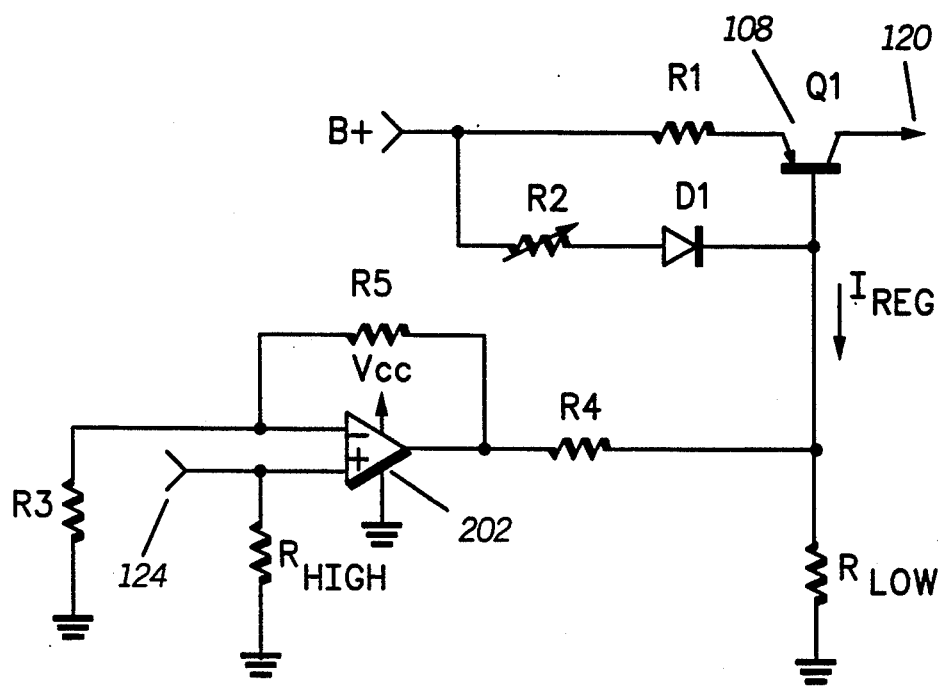
FIG. 2 is a simplified schematic of a charger in accordance with the invention.

In FIG. 2, a simplified schematic of transistor 108 and voltage controlled current source 112 is shown. The voltage controlled current source 112 consists of a non-inverting operational amplifier 202 configured as a linear voltage controlled current source. As the control signal voltage present at input terminal 124 increases, the amount of current flowing out of the output terminal (collector) 120 of transistor 108 increases. This is controlled by the voltage output of the operational amplifier which develops a control current to ground via resistors R4 and $R_{LOW}$. For example, assuming that R1=5 ohms, R2=34 ohms, R3=10 K ohms, R4=33 ohms, R5=22 K ohms, RHIGH=1 Megaohm, R LOW=30 ohms, transistor beta=100, transistor VEB=0.7 volts and B+=7.5 volts, the amount of charging current provided at output terminal 120 versus the amount of input control voltage is as follows:

TABLE 1

| Charge Current (Amps) | Input Control Voltage (Volts) |
| --- | --- |
| 0 | 0 |
| .6 | 1 |
| 1.1 | 2 |
| 1.6 | 3 |
| 2.1 | 4 |
| 2.6 | 5 |

As the input control voltage is varied between the input control voltage range (0-5 volts), the charge current provided to battery 106 is modified. Preferably, DAC 146 should be capable of providing control voltages to voltage controlled current source 112 having a resolution of at least 0.1 volts. In this manner, the amount of charge current can be controlled with a good level of precision for most charging applications.

Figure 3:
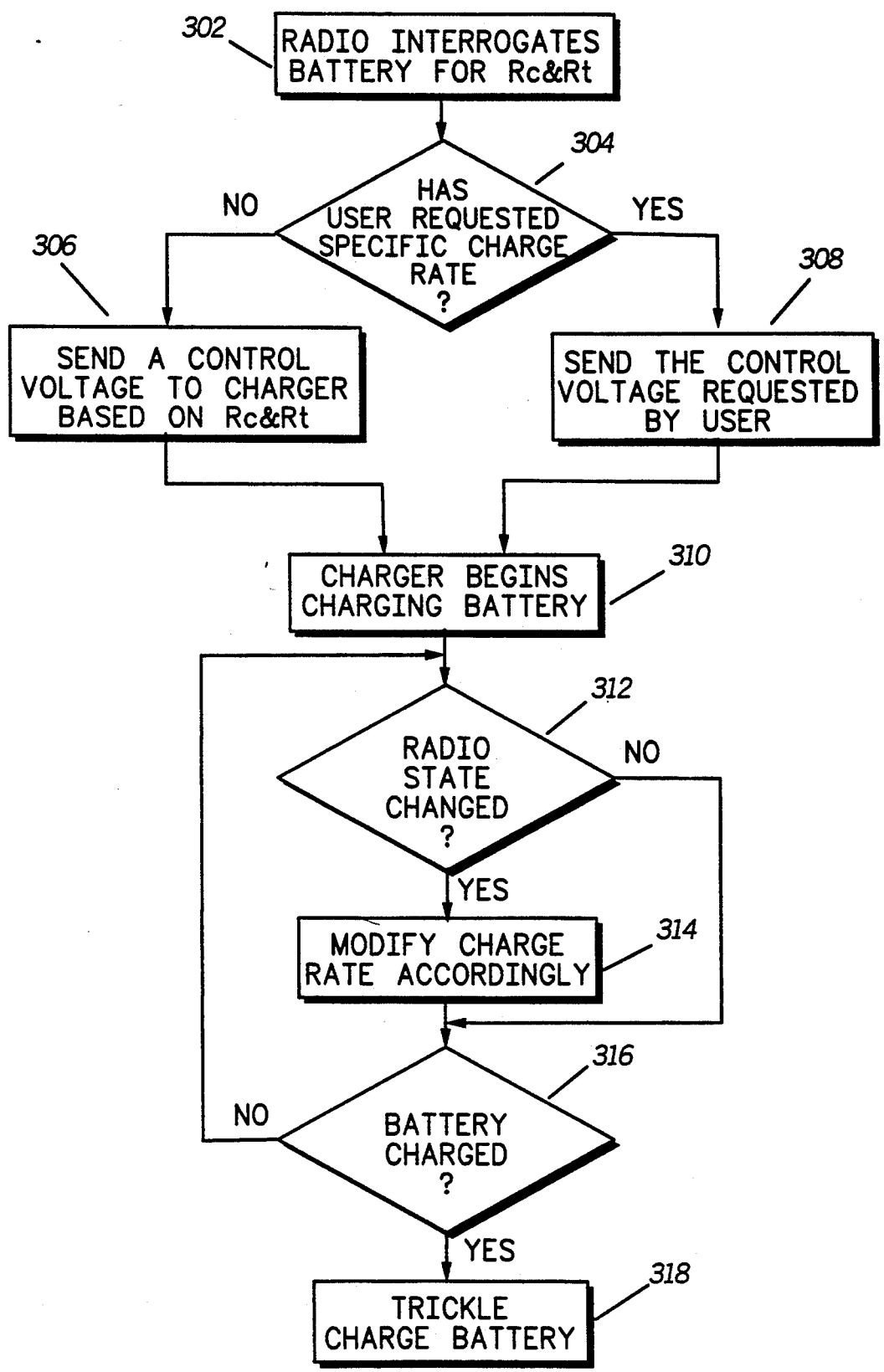
FIG. 3 is a flowchart showing a typical charge routine in accordance with the present invention.

Referring now to FIG. 3, a flow chart showing a typical charge process in accordance with the present invention is shown. In step 302, radio 104 interrogates battery 106 and determines the capacity and temperature of the battery by sensing-resistance's Rt and Rc. In step 304, radio 104 determines if the radio user has requested a specific charge rate to be employed. A user can request a specific charge rate by entering a specific key sequence on the radio's keypad (not shown) which informs controller 126 of his request. A user may want to specify a specific charge rate in order to customize the charging of battery 106 in order for the battery charging to be in accordance with the manner in which the user utilizes his radio (e.g., heavy duty cycle user such as police departments, may want to have battery 106 charged quicker than other low duty cycle users which may want a slower rate of charge).

In step 306, if the user has not requested a specific charge rate, controller sends a control signal (voltage level) from DAC output 136 to charger 102 based on the batteries parameters (Rc and Rt). Controller 126 will preferably have a list of control voltages to be used based on different Rc and Rt values stored in it's memory locations. If the radio user has specified a specific charge rate, in step 308, that rate is converted to a control signal which is sent by radio 104. Controller 126 will preferably make sure that the charge rate requested by the user is appropriate for the capacity of battery 106 and the temperature present in the battery. If the charge rate requested by the user is not appropriate, controller 126 can inform the user via a display or other annunciation means in order to make the user select a different charge rate or default to a preprogrammed charge rate based on Rc and Rt.

In step 310, charger 102 begins to charge battery 106. In step 312, the radio state is checked by controller 126. Radio state mean that the radio can be in a standby-by state, a state in which the radio is about to commence transmitting, or in a state where the radio is receiving information. Standby condition draws the least amount of current, followed by receive state and finally the transmit state. If the radio's operations changes the amount of current it is drawing from battery 106 by a predetermined amount, this can be considered a change in radio state. Since controller 126 knows immediately of any changes in the state of radio 102, it can compensate for the current required by radio 102 in step 314, by modifying the control signal sent to charger 102 in order to compensate for the change in current requirements. For example, if radio is about to transmit a message (e.g., push-to-talk switch activated), controller 126 can immediately increase the charge rate by the amount of current required during a transmission. In this manner, battery 106 can be charged quicker than by user prior art chargers.

In step 316, controller 126 determines if the battery has changed state. Changes in battery state can mean that battery 106 has been changed to a battery having a higher or lower capacity, battery has been charged, or that the temperature or other battery parameters have changed by a predetermined amount. In step 316, the radio determines if the battery has been charged (which is one type of change in battery state) using anyone of a number of charge determination techniques, such as delta temperature (by checking Rt), delta voltage (by monitoring the voltage level of the battery), etc. Finally, in step 318, if battery 106 has been determined to be charged, charger is placed in a trickle charge mode by controller 126.

In summary, the present invention provides a way of using the electronic device's controller to control the charge rate provided by the electronic device's battery charger. This not only helps reduce the cost of charger 102, but also provides for a battery charging system which can provide different charge rates based not only on the batteries condition but the condition of the electronic device. The present invention also allows for the electronic device controller to compensate for any current consumption changes while the device's battery is being charged.

What is claimed is:

1. A method for charging using a controller-less battery charger an electronic device having a battery, the battery having a battery parameter, the method comprising the steps of:
   at the electronic device;
   sending a first control signal from the electronic device to the battery charger;
   monitoring the battery parameter;
   sending a second control signal to the battery charger if the battery parameter has reached a predetermined level;
   monitoring the electronic device for any changes in the state of the electronic device while the battery is being charged;
   sending a third control signal to the battery charger if the electronic device has changed state; and
   at the controller-less battery charger:
   receiving the first control signal:
   providing the first control signal to a variable current source:
   charging the battery using the variable current source at a first charge rate corresponding to the control signal;
   charging the battery at a second charge rate corresponding to the second control signal when the second control signal is provided to the variable current source;
   receiving the third control signal if it is sent by the electronic device; and
   modifying the charge rate at which the battery is being charged as a function of the third control signal.

2. A method as defined in claim 1, wherein the step of monitoring the battery parameter of the battery comprises the step of:
   determining the change in temperature of the battery over a predetermined period of time.

3. A method as defined in claim 1, wherein the step of monitoring the electronic device for any changes in state comprises determining if the electronic device is about to require a different amount of current to operate then it had been currently using.

4. An electronic device having a rechargeable battery which can be recharged using a controller-less battery charger, the rechargeable battery having at least one battery parameter, the electronic device comprising:
   control means for determining the at least one battery parameter from the rechargeable battery;
   output means for providing a control signal which is a function of the at least one battery parameter to the controller-less battery charger, the control signal sets the rate at which the rechargeable battery is charged; and the control means also determines if the amount of current which is being consumed by the electronic device has changed by a predetermined amount and if so, the control means informs the output means to send a new control signal to the battery charger in order to modify the rate at which the rechargeable battery is being charged.

5. An electronic device as defined in claim 4, wherein the control signal is a voltage level which is a function of the at least one battery parameter.

* * * * *